US011909807B2

(12) United States Patent
Tiberg et al.

(10) Patent No.: US 11,909,807 B2
(45) Date of Patent: Feb. 20, 2024

(54) LOCAL RECORDING FOR DEMONSTRATION OF WEB-BASED SOFTWARE APPLICATIONS

(71) Applicant: DEMOSTACK, INC., San Francisco, CA (US)

(72) Inventors: Gonen Tiberg, Tel Aviv (IL); Aaron Bar Hakim, Rishon LeZion (IL); Ben Sterenson, Ra'anana (IL); Rotem Maya Dantess, Ramat Gan (IL); Gilad Avidan, Tel Aviv (IL); Yehonatan Ernest Friedman, San Francisco, CA (US)

(73) Assignee: DEMOSTACK, INC., San Francisco, CA (US)

( * ) Notice: Subject to any disclaimer, the term of this patent is extended or adjusted under 35 U.S.C. 154(b) by 24 days.

(21) Appl. No.: 17/746,981

(22) Filed: May 18, 2022

(65) Prior Publication Data
US 2023/0379378 A1    Nov. 23, 2023

(51) Int. Cl.
*H04L 67/02* (2022.01)
*H04L 61/4511* (2022.01)

(52) U.S. Cl.
CPC .......... *H04L 67/02* (2013.01); *H04L 61/4511* (2022.05)

(58) Field of Classification Search
CPC .............................. H04L 67/02; H04L 61/4511
See application file for complete search history.

(56) References Cited

U.S. PATENT DOCUMENTS

| 5,548,724 A * | 8/1996 | Akizawa ................. G06F 9/505 |
| | | 711/111 |
| 6,608,634 B1 | 8/2003 | Sherrard et al. |

(Continued)

FOREIGN PATENT DOCUMENTS

| CN | 103595824 A | 10/2013 |
| CN | 103685138 A | 3/2014 |

(Continued)

OTHER PUBLICATIONS

International Application # PCT/US22/45592 Search Report dated Jan. 31, 2023.

(Continued)

*Primary Examiner* — Andrew C Georgandellis
(74) *Attorney, Agent, or Firm* — Kligler & Associates Patent Attorneys Ltd.

(57) ABSTRACT

In embodiments of the present invention, a processor executing a web browser detects a first request including a Hypertext Transfer Protocol (HTTP) request conveyed by the web browser to a first server for a web page including browser-executable code for a web-based application, and a response received from the first server including the requested browser-executable code, wherein the first HTTP request includes a first Uniform Resource Locator (URL). In the browser-executable code, a second request to a second server for a web resource and including a second URL is identified, and the second URL in the browser-executable code is modified so as to reference a third server. The first URL is modified so as to reference a fourth server, and the modified browser-executable code is stored on the fourth server so as to be referenced by the modified first URL.

25 Claims, 11 Drawing Sheets

(56) References Cited

U.S. PATENT DOCUMENTS

| | | | |
|---|---|---|---|
| 7,139,978 | B2 | 11/2006 | Rojewski et al. |
| 8,108,490 | B2 | 1/2012 | Guo |
| 8,332,637 | B2 | 12/2012 | Relyea |
| 8,433,733 | B2 | 4/2013 | Sayed et al. |
| 8,543,675 | B1 * | 9/2013 | Yiu .................. G06F 16/957 709/245 |
| 9,237,204 | B1 | 1/2016 | Martini et al. |
| 10,659,566 | B1 | 5/2020 | Luah et al. |
| 2004/0054715 | A1 | 3/2004 | Cesario |
| 2004/0100507 | A1 | 5/2004 | Hayner et al. |
| 2004/0221033 | A1 | 11/2004 | Davis et al. |
| 2009/0089404 | A1 | 4/2009 | Guo |
| 2010/0318507 | A1 | 12/2010 | Grant et al. |
| 2011/0246879 | A1 | 10/2011 | White et al. |
| 2012/0079374 | A1 * | 3/2012 | Gaddis ................ G06F 16/9577 715/269 |
| 2012/0204102 | A1 | 8/2012 | Gwin et al. |
| 2013/0007622 | A1 | 1/2013 | Ke et al. |
| 2014/0173417 | A1 * | 6/2014 | He ....................... G06F 40/123 715/234 |
| 2014/0289855 | A1 | 9/2014 | Schulman et al. |
| 2015/0205772 | A1 | 7/2015 | Leventhal |
| 2016/0173925 | A1 | 6/2016 | Gordon et al. |
| 2017/0351484 | A1 | 12/2017 | Stuckman et al. |
| 2018/0123934 | A1 * | 5/2018 | Gissing ................ H04L 61/301 |
| 2018/0205782 | A1 | 7/2018 | Wei et al. |
| 2019/0079787 | A1 | 3/2019 | Toksoz et al. |
| 2019/0392057 | A1 | 12/2019 | Denoue et al. |
| 2021/0203635 | A1 | 7/2021 | Shalikashvili et al. |
| 2021/0256200 | A1 | 8/2021 | Miller et al. |
| 2022/0004594 | A1 | 1/2022 | Smith et al. |

FOREIGN PATENT DOCUMENTS

| | | |
|---|---|---|
| CN | 110196744 A | 5/2019 |
| CN | 112882953 A | 6/2021 |

OTHER PUBLICATIONS

U.S. Appl. No. 17/949,263 Office Action dated May 17, 2023.

"Android—Login Screen," pp. 1-10, year 2022 https://www.tutorialspoint.com/android/android_login_screen.htm.

Wikipedia, "Selenium (Software)," pp. 1-6, last edited Sep. 21, 2021.

"Android Developers—WindowManager. LayoutParams—Flag_Secure," pp. 1-91, last updated Jul. 14, 2021 https://web.archive.org/web/20211005002148/https://developer.android.com/reference/android/view/WindowManager.LayoutParams.

Bar Hakim et al., U.S. Appl. No. 17/949,263, filed Sep. 21, 2022.

Bar Hakim et al., U.S. Appl. No. 17/959,319, filed Oct. 4, 2022.

"AppAuth—Android," GitHub, Inc., pp. 1-5, Sep. 12, 2021 https://web.archive.org/web/20210912131650/https://openid.github.io/AppAuth-Android/.

"Mitmproxy docs—About Certificates," pp. 1-5, Sep. 22, 2021 https://web.archive.org/web/20210922085629/https://docs.mitmproxy.org/stable/concepts-certificates/.

"Android Developers—Network Security Configuration," pp. 1-12, Sep. 26, 2021 https://developer.android.com/training/articles/security-config.

"Square/retrofit," Square, Inc., pp. 1-2, year 2013 https://github.com/square/retrofit.

"Square/okhttp," GitHub, Inc., pp. 1-5, Sep. 28, 2021 https://github.com/square/okhttp.

Hardt, Ed., "The OAuth 2.0 Authorization Framework," Request for Comments 6749, pp. 1-76, Oct. 2012.

"React Tutorial From Scratch: A Step-by-Step Guide," lbaslogic.com, pp. 1-27, year 2021 https://software-sources.com/solutions/highsoft/.

"AngularJS—Superheroic Java Script MNW Framework," Google, pp. 1-4, years 2010-2021 https://angularjs.org/.

"PagerDuty," PagerDuty, Inc., Google Play, pp. 1-3, Jun. 11, 2021 https://web.archive.org/web/20210624164153/https://play.google.com/store/apps/details?id=com.pagerduty.android.

"Mitmproxy is a Free and Open Source Interactive HTTPS Proxy," Mitmproxy Project, pp. 1-4, Sep. 26, 2021 https://mitmproxy.org/.

"Apktool—A Tool for Reverse Engineering Android apk Files," pp. 1-3, Sep. 16, 2021 https://web.archive.org/web/20210916012637/https://ibotpeaches.github.io/Apktool/.

"APK Downloder," Evozi, pp. 1-2, year 2020 https://apps.evozi.com/apk-downloader/.

"Android Developers," pp. 1-6, last updated Jul. 22, 2020 https://web.archive.org/web/20210812034151/https://developer.android.com/guide/topics/manifest/provider-element.

Betapage, "Sitemod.io—Modify any website in real-time, Save your mod and Share it with the world", pp. 1-3, year 2022 https://betapage.co/product/sitemod-io.

Prestipino, "Modify Any Website in Real-Time with Sitemod.io & Chrome Developer Tools", pp. 1-3, Sep. 21, 2017 https://www.websitemagazine.com/blog/modify-any-website-in-real-time-with-sitemod-io-chrome-developer-tools.

"Sitemod.io—Fork Demo", p. 1, YouTube Clip, last edited May 7, 2021 https://chrome.google.com/webstore/detail/sitemodio/efjbaneaebkanjmhengnedpllfdiocin?itemlang=te&hl=en.

Meclea, "Sitemod.io—Fork Demo", YouTube Clip, p. 1, Oct. 10, 2017 https://www.youtube.com/watch?v=COzKh56T0OM.

"Edit Any Website—No Code Required", pp. 1-6, year 2019-2022 https://goedit.me/.

Highsoft AS, "Highcharts", pp. 1-9, year 2021 https://software-sources.com/solutions/highsoft/.

Wikipedia, "Remote Desktop Protocol," pp. 1-11, last edited Sep. 21, 2021 https://web.archive.org/web/20210924044957/https://en.wikipedia.org/wiki/Remote_Desktop_Protocol.

"Microsoft Edge", p. 1, May 2015 https://www.techtarget.com/whatis/definition/Microsoft-Edge.

Bak Hakim et al., U.S. Appl. No. 63/253,135, filed Oct. 7, 2021.

International Application # PCT/US2023/066801 Search Report dated Sep. 19, 2023.

U.S. Appl. No. 17/959,319 Office Action dated Sep. 19, 2023.

International Application # PCT/US2023/065981 Search Report dated Aug. 4, 2023.

* cited by examiner

LOCAL RECORDING FOR DEMONSTRATION OF WEB-BASED SOFTWARE APPLICATIONS

FIELD OF THE INVENTION

The present invention relates generally to demonstration software, and specifically to recording and presenting (i.e., executing) a recorded demonstration of a web-based software application.

BACKGROUND OF THE INVENTION

A product demonstration (i.e., "demo") is typically used to present a software application such as a business-to-business software as a service application. The product demo can be used to show the value of a software application to a current or prospective customer, and typically involves a demonstration of the application's core features and capabilities.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including executing, by a processor, a web browser, detecting, by the processor, a first request including a Hypertext Transfer Protocol (HTTP) request conveyed by the web browser to a first server for a web page including browser-executable code for a web-based application, and a response received from the first server including the requested browser-executable code, wherein the first request includes a first Uniform Resource Locator (URL), identifying, in the browser-executable code, a second request to a second server for a web resource and including a second URL, modifying, in the browser-executable code, the second URL so as to reference a third server, modifying the first URL so as to reference a fourth server, and storing, on the fourth server, the modified browser-executable code so as to be referenced by the modified first URL.

In one embodiment, the servers have respective domain names, and the domain name for the first server matches the domain name for the second server.

In another embodiment, the first server and the second server have respective domain names, and the domain name for the first server does not match the domain name for the second server.

In an additional embodiment, the third server and the fourth server have respective domain names, and the domain name for the third server matches the domain name for the second server.

In a further embodiment, the third server and the second server have respective domain names, and wherein the domain name for the first server does not match the domain name for the second server.

In a supplemental embodiment, the processor and the second server communicate via a private network.

In a first playback embodiment, the method further includes receiving, by the fourth server from a client computer subsequent to storing the modified browser-executable code, a third request including an HTTP request including the modified first URL, conveying, by the fourth server responsively to the third request, the modified browser-executable code to the client computer, and subsequent to conveying the modified browser-executable code, receiving, by the third server from the client computer, a fourth request for the web resource and including the modified second URL.

In a second playback embodiment, the method further includes detecting, by the processor prior to receiving the third request, an additional request conveyed by the browser to the second server for the web resource, and detecting a response received from the second server including the requested web resource.

In a third playback embodiment, the method further includes storing the web resource to the third server so as to be referenced by the modified second URL.

In a fourth playback embodiment, the method further includes conveying, by the third server responsively to the fourth request, the stored web resource to the client computer.

In a first resource embodiment, the browser-executable code includes a first browser-executable code, and the web resource includes a second browser-executable code.

In a second resource embodiment, the executable code includes HyperText Markup Language (HTML) code.

In a third resource embodiment, the browser executable code includes JavaScript code.

In a fourth resource embodiment, the browser executable code includes Cascading. Style Sheet (CSS) code.

In a fifth resource embodiment, the browser executable code includes executable binary code.

In a sixth resource embodiment, the web resource includes a font.

In a seventh resource embodiment, the web resource includes an image.

In an eighth resource embodiment, the web resource includes cleartext.

In one embodiment, the second request includes an application program interface (API) call, and the web resource includes an API service.

In a another embodiment, the second request includes a database query, and the web resource includes database data.

In a further embodiment, the browser-executable code for a web-based application references a first set of resources, and the method further includes detecting, by the client computer, an additional request from the modified browser-executable code to access or manipulate a given resource, and providing, by the client computer a response simulating the given resource.

There is also provided, in accordance with an embodiment of the present invention, an apparatus, including a memory configured to store a web browser, and a processor configured to execute the web browser, to detect a first request including a Hypertext Transfer Protocol (HTTP) request conveyed by the web browser to a first server for a web page including browser-executable code for a web-based application, and a response received from the first server including the requested browser-executable code, wherein the first request includes a first Uniform Resource Locator (URL), to identify, in the browser-executable code, a second request to a second server for a web resource and including a second URL, to modify, in the browser-executable code, the second URL so as to reference a third server, to modify the first URL so as to reference a fourth server, and to store, on the fourth server, the modified browser-executable code so as to be referenced by the modified first URL.

There is additionally provided, in accordance with an embodiment of the present invention, a computer software product, including a non-transitory computer-readable medium, in which program instructions are stored, which instructions, when read by a computer, cause the computer to execute a web browser, to detect a first request including a Hypertext Transfer Protocol (HTTP) request conveyed by the web browser to a first server for a web page including browser-executable code for a web-based application, and a response received from the first server including the requested browser-executable code, wherein the first request includes a first Uniform Resource Locator (URL), to identify, in the browser-executable code, a second request to a second server for a web resource and including a second URL, to modify, in the browser-executable code, the second URL so as to reference a third server, to modify the first URL so as to reference a fourth server, and to store, on the fourth server, the modified browser-executable code so as to be referenced by the modified first URL.

There is further provided, in accordance with an embodiment of the present invention, a method, including executing, by a processor, a web browser, detecting, by the web browser, a first request including a Hypertext Transfer Protocol (HTTP) request conveyed by the web browser to a first server for a web page including browser-executable code for a web-based application, and a response received from the first server including the requested browser-executable code, wherein the first request includes a first Uniform Resource Locator (URL), detecting, by the browser, a second request to a second server for a web resource and including a second URL), and a response from the second server including the requested web resource, storing, by the browser, the browser executable code and the web resource to a recording, retrieving, by the web browser, the browser-executable code from the recording, detecting, by the web browser subsequent to retrieving the browser-executable code, a third request for the web resource and including the second URL, and retrieving, by the web browser in response to the third request, the web resource from the recording.

In some embodiments, the web browser includes a first web browser, the steps of executing the first web browser, detecting the first and the second requests, and storing the browser executable code and the web resource are performed by a first processor, detecting the third request includes detecting, by a second browser executing on a second processor, the third request, and retrieving the web resource includes retrieving, by the second web browser, the web resource.

There is also provided, in accordance with an embodiment of the present invention, an apparatus, including a memory configured to store a web browser, and a processor configured to execute the web browser, detecting, by the web browser, a first request including a Hypertext Transfer Protocol (HTTP) request conveyed by the web browser to a first server for a web page including browser-executable code for a web-based application, and a response received from the first server including the requested browser-executable code, wherein the first request includes a first Uniform Resource Locator (URL), to detect, by the browser, a second request to a second server for a web resource and including a second URL, and a response from the second server including the requested web resource, to store, by the browser, the browser executable code and the web resource to a recording, to retrieve, by the web browser, the browser-executable code from the recording, to detect, by the web browser subsequent to retrieving the browser-executable code, a third request for the web resource and including the second URL, and to retrieve, by the web browser in response to the third request, the web resource from the recording.

There is additionally provided, in accordance with an embodiment of the present invention, a computer software product, including a non-transitory computer-readable medium, in which program instructions are stored, which instructions, when read by a computer, cause the computer to execute a web browser, to detect, by the web browser, a first request including a Hypertext Transfer Protocol (HTTP) request conveyed by the web browser to a first server for a web page including browser-executable code for a web-based application, and a response received from the first server including the requested browser-executable code, wherein the first request includes a first Uniform Resource Locator (URL), to detect, by the browser, a second request to a second server for a web resource and including a second URL, and a response from the second server including the requested web resource, to store, by the browser, the browser executable code and the web resource to a recording, to retrieve, by the web browser, the browser-executable code from the recording, to detect, by the web browser subsequent to retrieving the browser-executable code, a third request for the web resource and including the second UPI, and to retrieve, by the web browser in response to the third request, the web resource from the recording.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
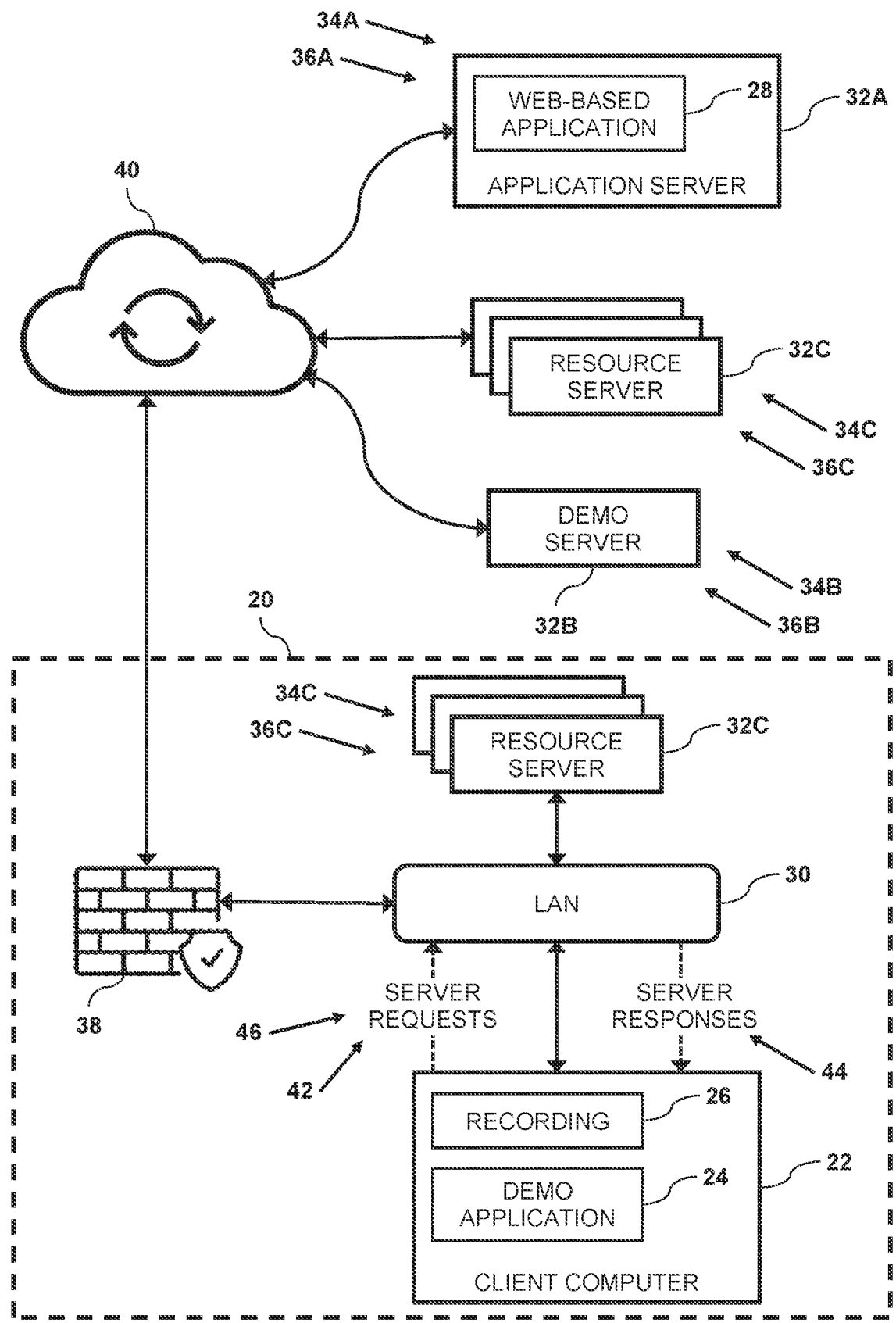
FIG. 1 is a block diagram that schematically shows a computing facility comprising a client computer that executes a local recording module so as to generate a demo recording of a web-based application hosted by an application server, in accordance with an embodiment of the present invention.

Embodiments of the present invention provide methods and systems for generating and executing demonstration versions of web-based software applications. In embodiments herein, the web-based application comprises any software application that is accessed, by a computing device, over a network connection using Hypertext Transfer Protocol (HTTP), rather than existing within a device's memory. Web-based applications often run inside a web browser.

As described hereinbelow, while executing, a web browser, a processor detects a first request comprising a Hypertext Transfer Protocol (HTTP) request conveyed by the web browser to a first server for a web page comprising browser-executable code for a web-based application, and a response received from the first server comprising the requested browser-executable code, wherein the first request comprises a first Uniform Resource Locator (URL). A second request to a second server for a web resource and comprising a second URL are identified in the browser-executable code, and the second URL modified in the browser-executable code so as to reference a third server. The first URL is modified so as to reference a fourth server, and the modified browser-executable code is stored on the fourth server so as to be referenced by the modified first URL.

In some embodiments, an additional request conveyed by the browser to the second server for the web resource, and a response received from the second server comprising the requested web resource may be detected. Upon detecting and receiving the response, the web resource can be stored to the third server so as to be referenced by the modified second URL.

The steps described hereinabove can be repeated multiple times so as to create a demonstration version (referred to herein as a "demo recording") of the web-based application. In embodiments described herein, the demonstration version comprises a restricted clone of the web-based application (i.e., the web-based code of the web-based application and any web assets used by the application) that can then be executed (i.e., "played back") by a standard web browser.

Demonstration versions (i.e., of web-based application) created using embodiments described herein are functional applications that can be executed in standard or custom browsers, as described hereinbelow. As opposed to "recorded" demonstrations which play back interactions in the same order (i.e., a specific sequence of user input) as they were recorded, embodiments of the present invention enable users to interact with demonstration versions in any order.

As described hereinbelow, the demo recording can be played back in response to receiving, by the fourth server from a client computer (i.e., subsequent to storing the modified browser-executable code), a third request comprising an HTTP request (i.e., comprising the modified first URL). In response to the third request, the fourth server can convey the modified browser-executable code to the client computer. Subsequent to conveying the modified browser-executable code, upon the third server receiving from the client computer, a fourth request (i.e., comprising the modified second URL) for the web resource, the third server can convey the web resource to the client computer in response to the fourth request.

In one embodiment, the recording may comprise request/response pairs generated (a) in response to a user accessing one or more web pages in the web-based application, (b) in response to the user interacting with the web-based application, or (c) upon any other implicit/explicit activity invoked by browser-executable code in the web-based application. In another embodiment, the processor can execute the browser-based code so as to "crawl" (i.e., access) multiple web pages in the web-based application.

In some embodiments, the demo recording is created using a custom browser comprising a modified network layer that can capture the request/response pairs, and then store the captured request/response pairs to the demo recording. By executing the custom browser on a client computer behind a firewall (i.e., on a private network), embodiments of the present invention enable the modified network layer to record HTTP requests to servers behind (e.g., servers coupled to a corporate network) and/or servers beyond (e.g., servers on the Internet) the firewall, and record responses from those servers.

In an additional embodiment described hereinbelow, the user can execute the demo recording in a custom browser executing on a client computer that also stores the demo recording.

System Description

FIG. 1 is a block diagram that schematically shows an example or a computing facility 20 comprising a client computer 22 that can execute a demo application 24 configured to generate a demo recording 26 for a web-based application 28, in accordance with an embodiment of the present invention. Client computer 22 is coupled to a local area network 30 that enables the client computer to communicate with multiple servers 32 having respective Internet Protocol (IP) addresses 34 and domain names 36. Hardware and software components of client computer 22 are described in the description referencing FIG. 4 hereinbelow.

In FIG. 1, servers 32 and their respective hardware and software components, IP addresses 34 and domain names 36 can be differentiated by appending a letter to the identifying numeral, so that the servers comprise application server 32A having a corresponding IP address 34A and a corresponding domain name 36A, demo server 32B having a corresponding IP address 34B and a corresponding domain name 36B, and resource servers 32O having a corresponding IP address 34O and a corresponding domain name 36C. Application server 32A is described in the description referencing FIG. 2 hereinbelow, resource server 32C is described in the description referencing FIG. 3 hereinbelow, and demo server 32B is described in the description referencing FIG. 5 hereinbelow.

Computing facility 20 also comprises a firewall 38 that is coupled to a data network such as LAN 30 (also referred to herein as private network 30), thereby enabling client computer 22 to access a public network such as Internet 40. Therefore, in the configuration shown in FIG. 1 client computer 22 can access servers 32 that are behind firewall 38 (thereby enabling the client computer to communicate with a first subset of resource servers 32C coupled to private network 30) and servers 32 that are beyond the firewall (i.e., application server 32A, demo server 32B and a second subset of resource servers 32C). While embodiments herein describe computing facility comprising LAN 30, the computing facility comprising other types of data networks is considered to be within the spirit and scope of the present invention. For example, the data network may comprise a virtual private cloud (VPC) or any type of limited-access data network.

In embodiments described herein, client computer 22 conveys server requests 42 to servers 32 and receives corresponding server responses 41 from the servers. Each server request 42 typically comprises a Uniform Resource Locator (URL) 46 referencing a given server 42. In some embodiments, requests 42 may comprise (and therefore be referred to as) HTTP requests 42. In embodiments herein, HTTP requests 42 may comprise HTTP requests 42, HTTP/2 requests 42, and Hypertext Transfer Protocol Secure (HTTPS) requests 42.

Figure 2:
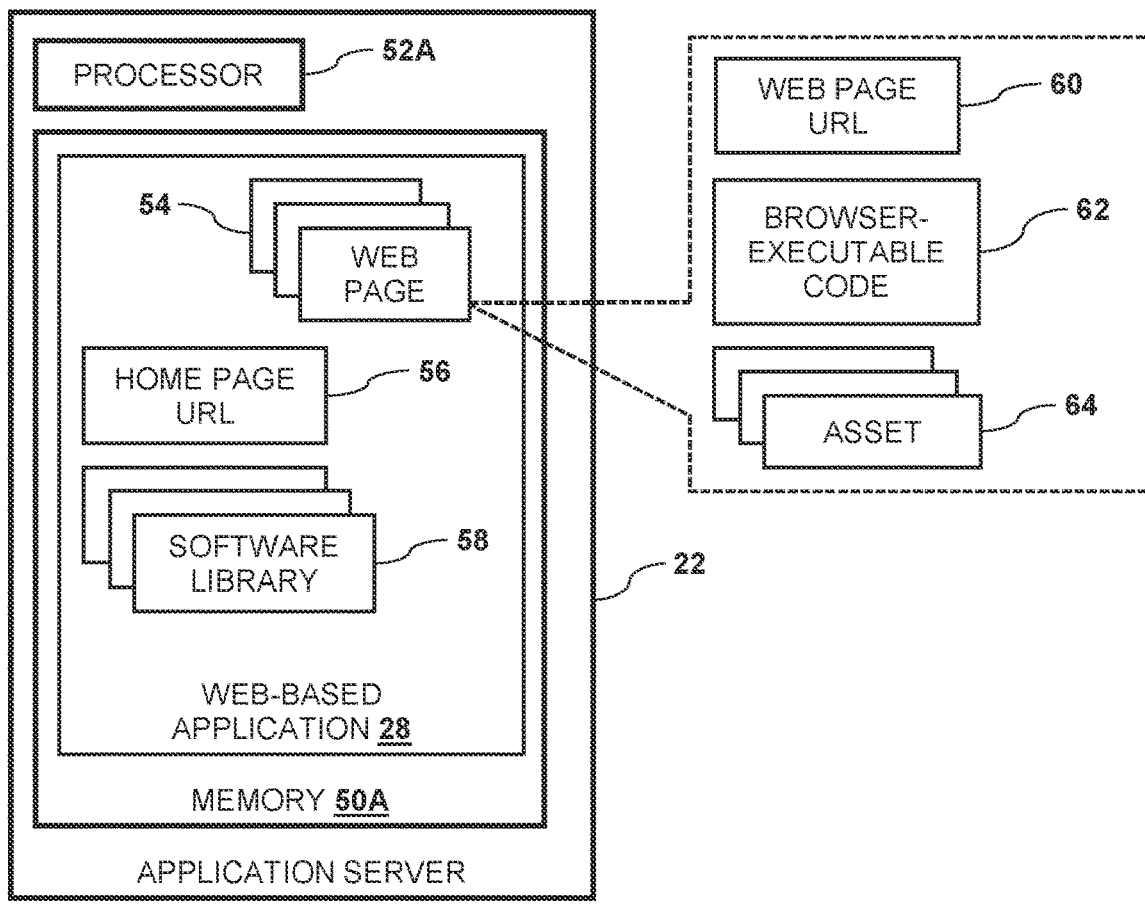
FIG. 2 is a block diagram that schematically shows hardware and software components of the application server, in accordance with an embodiment of the present invention.

FIG. 2 is a block diagram that schematically shows hardware and software components of application server 32A, in accordance with an embodiment of the present invention. Application server 32A may comprise an application memory. 50A that stores web-based application 28, and an application processor 52A that can execute the web-based application from the application memory.

In the configuration shown in FIG. 2, web-based application 28 comprises a set of web pages 54, a homepage URL 56 (i.e., a web address), and one or more software libraries 58. Examples of software libraries 58 include, but are not limited to, JavaScript libraries/frameworks such as REACT, ANGULAR and VUE. In embodiments herein web pages 54 comprise an example of web resources stored by servers 32.

Each web page 54 may comprise a web page URL 60, browser executable code 62 and one or more assets 64. Examples of browser-executable code 62 include HyperText Markup Language (HTML) code, JavaScript code, Cascading Style Sheet (CSS) code and binary executable code. Examples of assets 64 include fonts and images, API calls to APIs 72 and cleartext (e.g., redirect notices, JSON data etc.).

Home URL 56 typically comprises the web page URL for a given web page 54 that is a home (i.e., start) page for web-based application 28.

Figure 3:
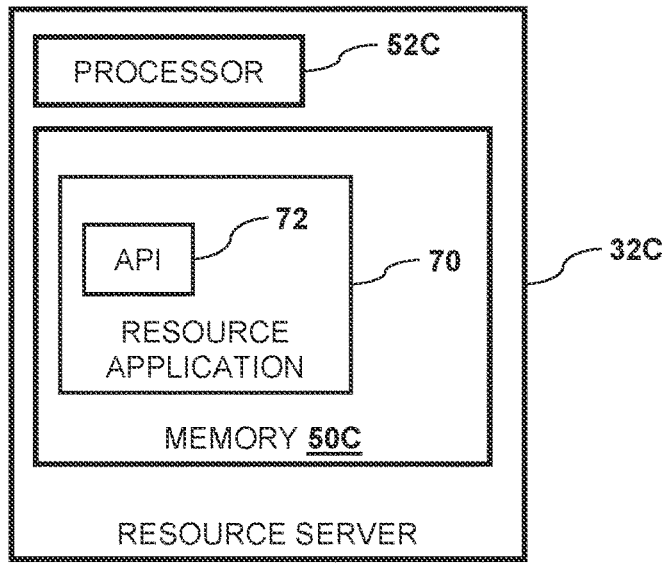
FIG. 3 is a block diagram that schematically shows hardware and software components of a resource server that can host web resources used by the web-based application, in accordance with an embodiment of the present invention.

FIG. 3 is a block diagram that schematically shows hardware and software components of a given resource server 32C that can host additional web resources (i.e., in addition to the web pages 54 in web-based application 28 as described in the description referencing FIG. 2 hereinabove), that can be accessed by web-based application 28, in accordance with an embodiment of the present invention. Examples of the additional web resources include database management systems (DBMS) and application programming interface (API) services such as GOOGLE MAPS™ (produced by ALPHABET INC., Mountain View, CA, USA).

In the configuration shown in FIG. 3, the given resource server comprises resource processor 520 that can execute resource application 70 (e.g., a DBMS application) from resource memory 50C. In one embodiment, resource application 70 comprises an API 72. In this embodiments, web-based application 28 can access resource application 70 via API calls to API 72. In another embodiment, web-based application 28 can access resource application 70 via a given HTTP request 42 (e.g., a DBMS query embedded in an HTTP request). A given web resource that can be accessed via a given API 72 may also be referred to as an API resource.

Figure 4:
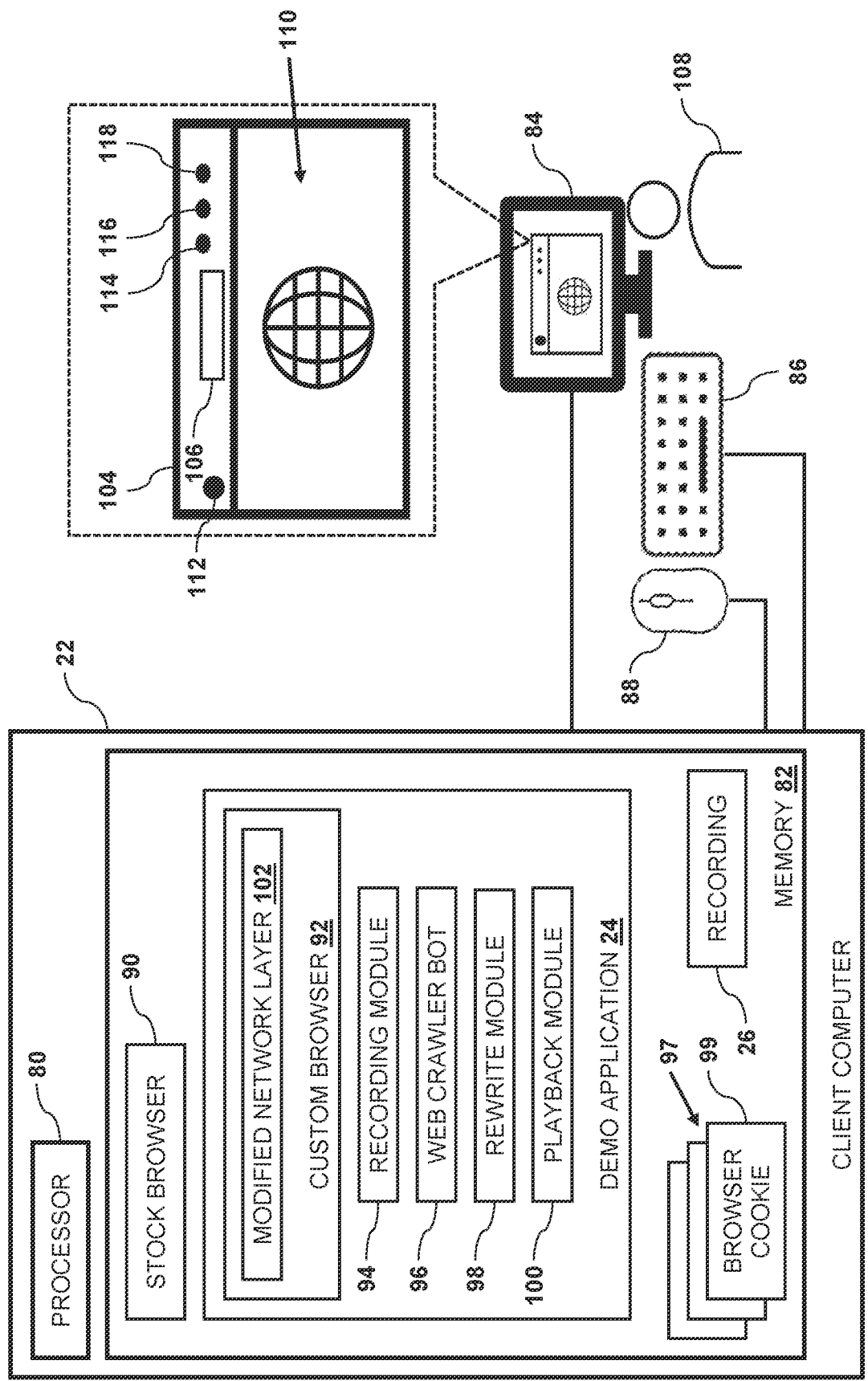
FIG. 4 is a block diagram that schematically shows hardware and software components of the client computer, in accordance with an embodiment of the present invention.

FIG. 4 is a block diagram that schematically shows hardware and software components client computer 22, in accordance with an embodiment of the present invention. Client computer 22 may comprise a client processor 80, a client memory 82, a display 84 and one or more input devices such as a keyboard 86 and a mouse 88.

Memory 82 can store a stock web browser 90, demo application 24 and demo recording 26. In embodiments described herein, processor 80 executes, from memory 82, stock browser 90 and demo application 24 and its respective modules. Stock web browser 90 may comprise any commercially available web browser such as EDGE™ (produced by MICROSOFT CORPORATION, Redmond WA, USA), or other types of browsers such as headless browsers or applications developed using a URL transfer library such as cURL. In one embodiment, as described in the descriptions referencing FIGS. 16 and 17 hereinbelow, browser 90 can retrieve and replay a version of demo recording 26 stored on demo server 32B.

In the configuration shown in FIG. 4, demo application 24 comprises a custom browser module 92, a recording module 94, a web crawler bot 96, a rewrite module 98 and a local playback module 100. In one embodiment custom browser 92 may be developed using any library that enables a user to develop software applications having web-browser functionality, and may comprise a custom network layer 102 that is configured to "capture" web resource requests 42 (i.e., requests 42 generated by browser-executable code 62) to servers 32 and the respective responses 44 from the servers. As described in the description referencing FIGS. 6-11 hereinbelow, recording module 94 can generate demo recording 26 by storing the server requests and the responses captured by modified network layer 102.

When executing, stock web browser 90 and custom browser 92 can present, on display 84, a browser frame 104 comprising a browser address bar 106. In response to a user 108 inputting (e.g., using keyboard 86) a given URL 46 into address bar 106, browsers 90 and 92 can access a web page (e.g., a given web page 54 in web-based application 28) indicated by the given URL, and present a rendering 110 of the web page in browser frame 104.

In a first recording embodiment, recording module 94 is configured to create demo recording 26 by storing requests 42 and responses 44 captured by modified network layer 102 as user 108 interacts with web-based application 28. Creating demo recording 26 using the first recording embodiment is described in the description referencing FIG. 10 hereinbelow.

Figure 11:
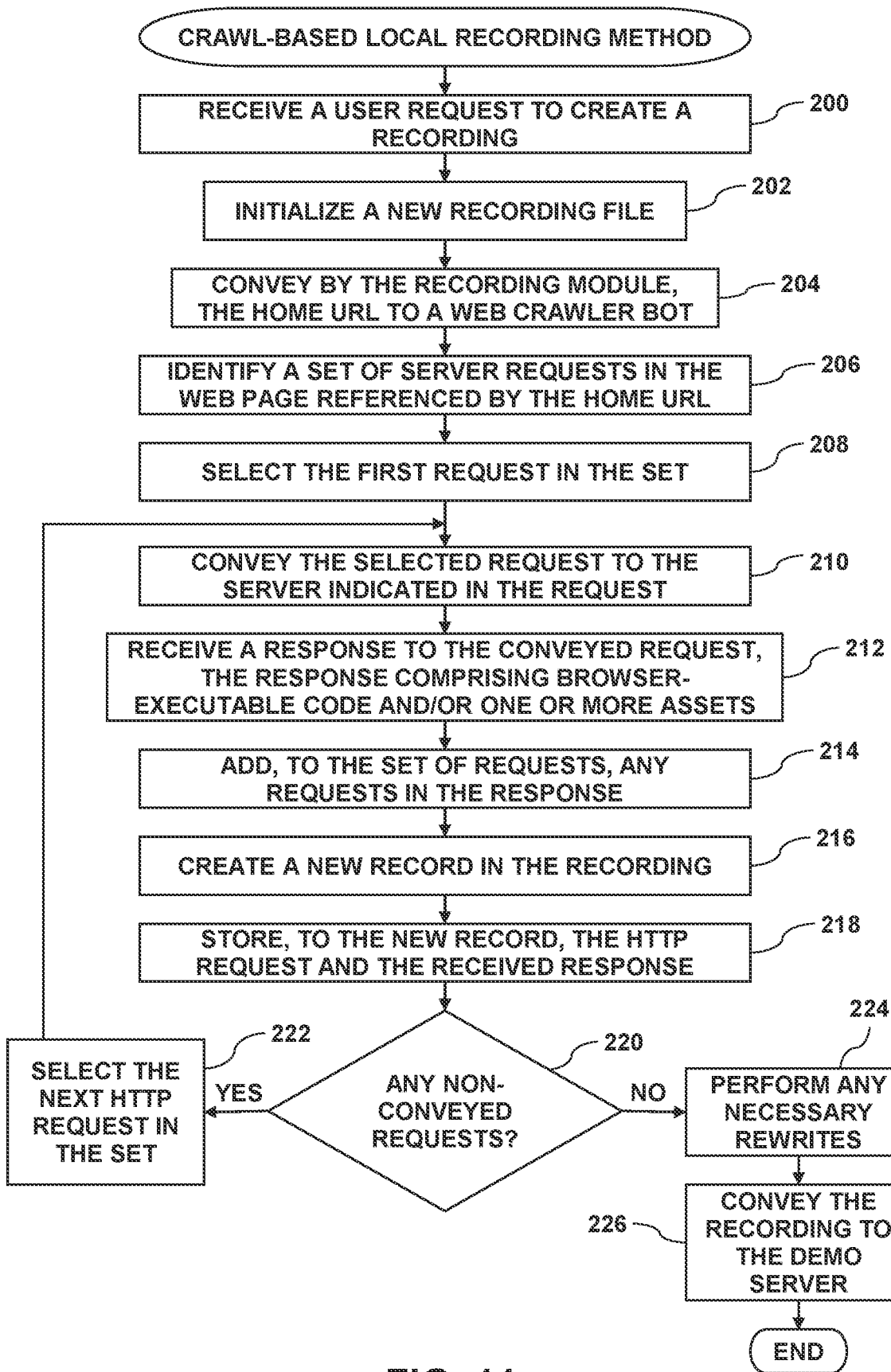
FIG. 11 is a flow diagram that schematically illustrates a method of creating a demo recording using a web crawler bot, in accordance with an embodiment of the present invention.

In a second recording embodiment, recording module 94 is configured to create a recording by storing requests 42 and responses 44 captured by modified network layer 102 as web crawler bot 96 "crawls" through all web pages 54 of web-based application 28 so as to identify all requests 42 in the web-based application, to convey the identified server requests to their respective servers 32, receive responses 44 to the requests, and store the "crawled" request/response pairs to demo recording 26. Creating demo recording 26 using the second recording embodiment is described in the description referencing. FIG. 11 hereinbelow.

Rewrite module 98 is configured to modify demo recording 26 so that it can be hosted by demo server 32B and executed by stock web browser 90. Rewriting demo recording 26 is described in the description referencing FIG. 12 hereinbelow.

Local playback module 100 is configured to play back a non-modified version of demo recording 26. Using local replay module 100 to play back demo recording. 26 is described in the description referencing FIGS. 13 and 14 hereinbelow.

In the configuration shown in FIG. 4, browser frame 104 may also comprise a recording button 112 that toggles (i.e., starts/stops) execution of recording module 94, a crawl button 114 that initiates execution of web crawler bot 96, a rewrite button 116 that initiates execution of rewrite module 96 and a replay button 118 that toggles execution of local playback module 100.

In some embodiments, memory 82 may also comprise a cookie store 97 comprising a set of one or more cookies 99 that web-based application 28 and/or recording 26 can read and/or write when executing on stock browser 90 or custom browser 92. Cookies 99 typically comprise small blocks of data created by server 32 while user 108 is browsing a website and stored to memory 82. While not shown in the Figures, servers 34 may comprise respective cookie stores 97.

Figure 5:
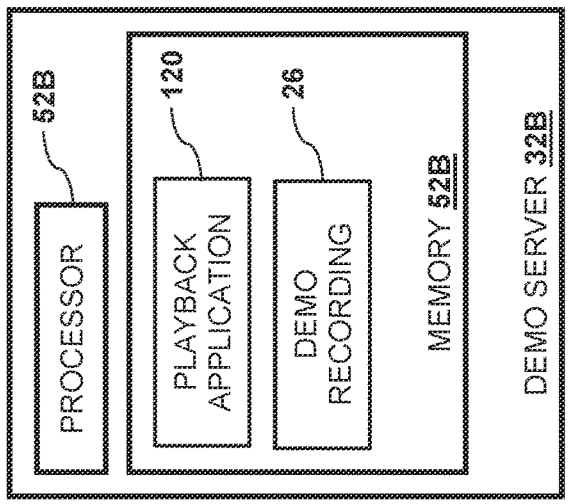
FIG. 5 is a block diagram that schematically shows hardware and software components of a demo server that can enable playback of the demo recording over the Internet, in accordance with an embodiment of the present invention.
Figure 15:
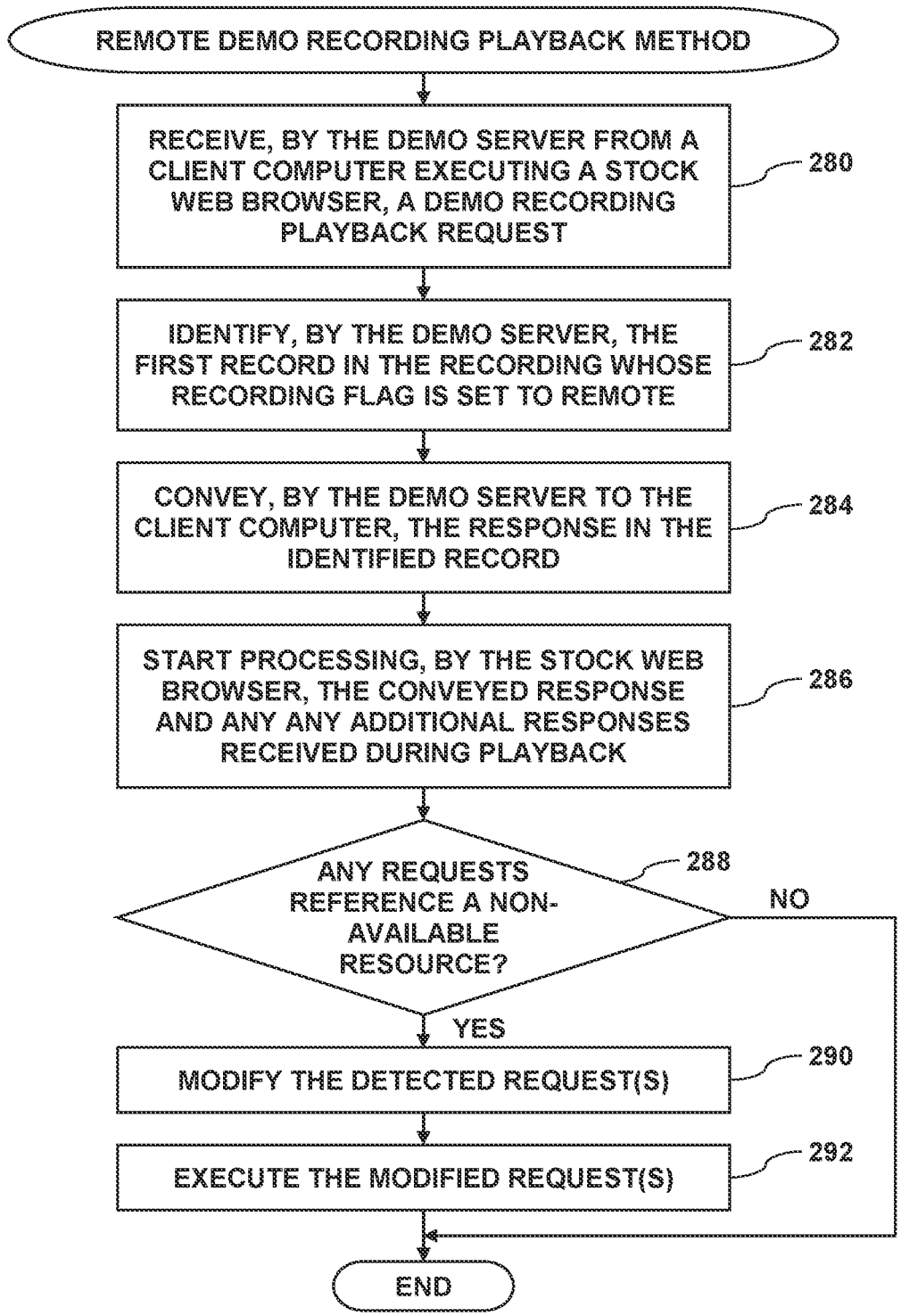
FIG. 15 is a flow diagram that schematically illustrates a method for the client computer to play back a demo recording stored on the demo server accessed via the Internet, in accordance with an embodiment of the present invention.
Figure 16:
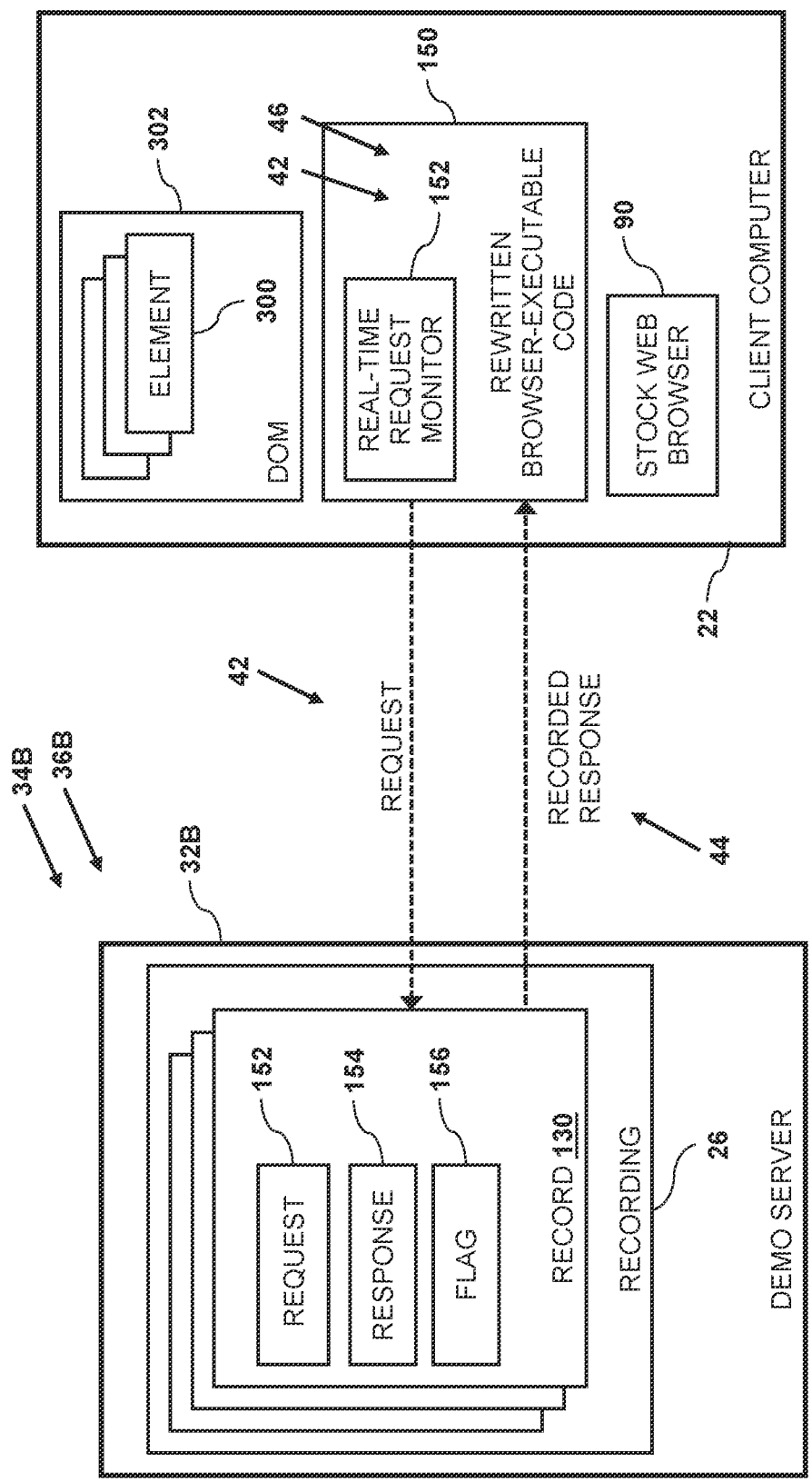
FIG. 16 is a block diagram that schematically illustrates data flowing between the stock browser executing on the client computer and the demo server when playing back the demo recording stored on the demo server, in accordance with an embodiment of the present invention.

FIG. 5 is a block diagram that schematically shows hardware and software components of demo server 32B, in accordance with an embodiment of the present invention. Demo server 32B may comprise demo processor 52B and demo memory 50C that can store a remote playback application 120. As described in the description referencing. FIGS. 15 and 16 hereinbelow, remote playback application 120 comprises a web-based application comprising browser-executable code that stock browser 90 can execute so as to enable the stock web browser to access and play back a modified version of demo recording 26 stored on demo server 32B.

Processors 52 and 80 comprises general-purpose central processing units (CPU) or special-purpose embedded processors, which are programmed in software or firmware to carry out the functions described herein. This software may be downloaded to client computer 22 or servers 32 in electronic form, over a network, for example. Additionally or alternatively, the software may be stored on tangible, non-transitory computer-readable media, such as optical, magnetic, or electronic memory media. Further additionally or alternatively, at least some of the functions of processors 52 and 80 may be carried out by hard-wired or programmable digital logic circuits.

Examples of memories 50 and 82 include dynamic random-access memories, non-volatile random-access memories, hard disk drives and solid-state disk drives.

In some embodiments, tasks described herein performed by client computer 22 and servers 32 may be split among multiple physical and/or virtual computing devices such as physical and/or virtual servers. In other embodiments, these tasks may be performed by a managed cloud service.

Figure 6:
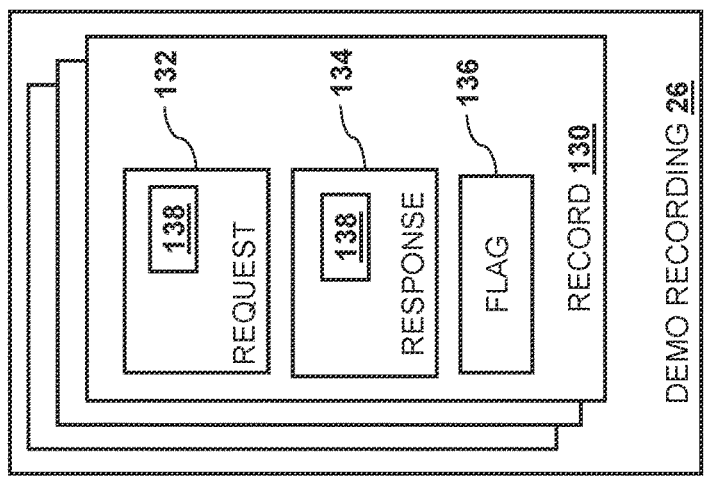
FIG. 6 is a block diagram that schematically shows data components of the demo recording, in accordance with an embodiment of the present invention.

FIG. 6 is a block diagram that schematically shows data components of demo recording 26, in accordance with an embodiment of the present invention. In the configuration shown in FIG. 6, demo recording 26 comprises a set of records 130, each of the records comprising a request 132, a given response 134 and a flag 136. As described hereinbelow, each request 132 stores a non-modified or modified copy of a given request 42, and each response 134 stores a non-modified or modified copy of a given response 44.

In embodiments described herein, demo recording. 26 comprises two records 130 for each pair of requests 42 and responses 44 captured by modified network layer 102. In the first record in the pair, recording module can store a given captured request 42 (i.e., to a given server 32) to request 132 and store the corresponding captured response 44 (i.e., from the given server) to response 134. Recording module 94 can then set flag 136 in the first record to LOCAL, indicating that the first record in the pair can be replayed by local playback module 100.

Each request 42 (and therefore each request 132) comprises a given request 42 for a given web resource 138. Examples of web resources 138 include browser executable code 62, assets 64, data (e.g., database data that can be requested via a database query) and API services (that can be requested by API calls to respective APIs 72). In some embodiments, as shown in FIG. 6, response 134 comprises the requested resource 138.

Upon completing recording demo recording 26, rewrite module 116 can store, to the second record in the pair, a rewritten (i.e., modified) request 42 (i.e., to demo server 32B) to request 132 and store a rewritten response 44 to response 134. Recording module 94 can then set flag 136 in the first record to REMOTE, indicating that the second record in the pair can be replayed by stock web browser 90. Rewriting records 130 is described in the description referencing FIG. 12 hereinbelow.

Figure 7:
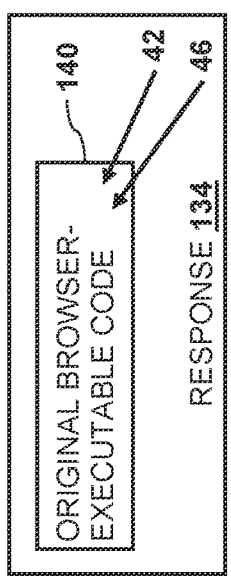
FIGS. 7-9 are block diagrams showing examples of recorded responses in the demo recording, in accordance with embodiments of the present invention.

FIG. 7 is a block diagram that schematically shows a given response 134 comprising original browser-executable code 140, in accordance with a first response embodiment of the present invention. In the first response embodiment, original browser-executable code 140 comprises a non-modified copy of a browser-executable code 62 of a given web page 54. Original browser-executable code 140 typically comprises one or more (non-modified) requests 42 comprising respective URLs 46.

Figure 8:
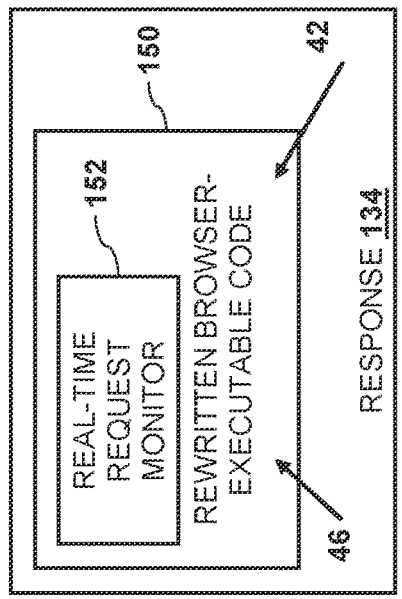

FIG. 8 is a block diagram that schematically shows a given response 134 comprising rewritten browser-executable code 150, in accordance with a second response embodiment of the present invention. In the second response embodiment, rewritten browser-executable code 150 comprises a modified copy (i.e., using embodiments described in the description referencing FIG. 12 hereinbelow) of a browser-executable code 62 of a given web page 54 rewritten browser-executable code 140 typically comprises one or more rewritten requests 42 comprising respective rewritten URLs 46, as described in the description referencing FIG. 12 hereinbelow).

In a second response embodiment, rewritten browser-executable code 150, may comprise a real-time request monitor 152 that can modify, in real-time, new requests 42 generated by the rewritten browser-executable code executing on stock web browser 90, as described in the description referencing FIGS. 15 and 16 hereinbelow. In one second response embodiment, rewrite module 98 may store real-time request monitor 152 in responses 134 (as shown in FIG. 8). In another second response embodiment where client computer 22 requests to execute demo recording 26 via playback application 120, the demo playback application may insert real-time request monitor 152 in responses 134 (i.e., comprising rewritten browser-executable code) processor 52 conveys to the workstation.

Figure 9:
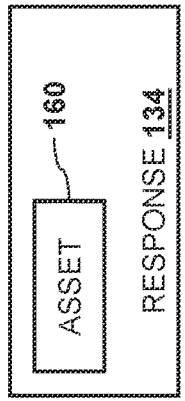

FIG. 9 is a block diagram that schematically shows a given response 234 comprising an asset 160, in accordance with a third response embodiment of the present invention. In the third response embodiment, asset 160 comprises a copy of a given asset 64 of a given web page 54.

Demo Recording Creation

Figure 10:
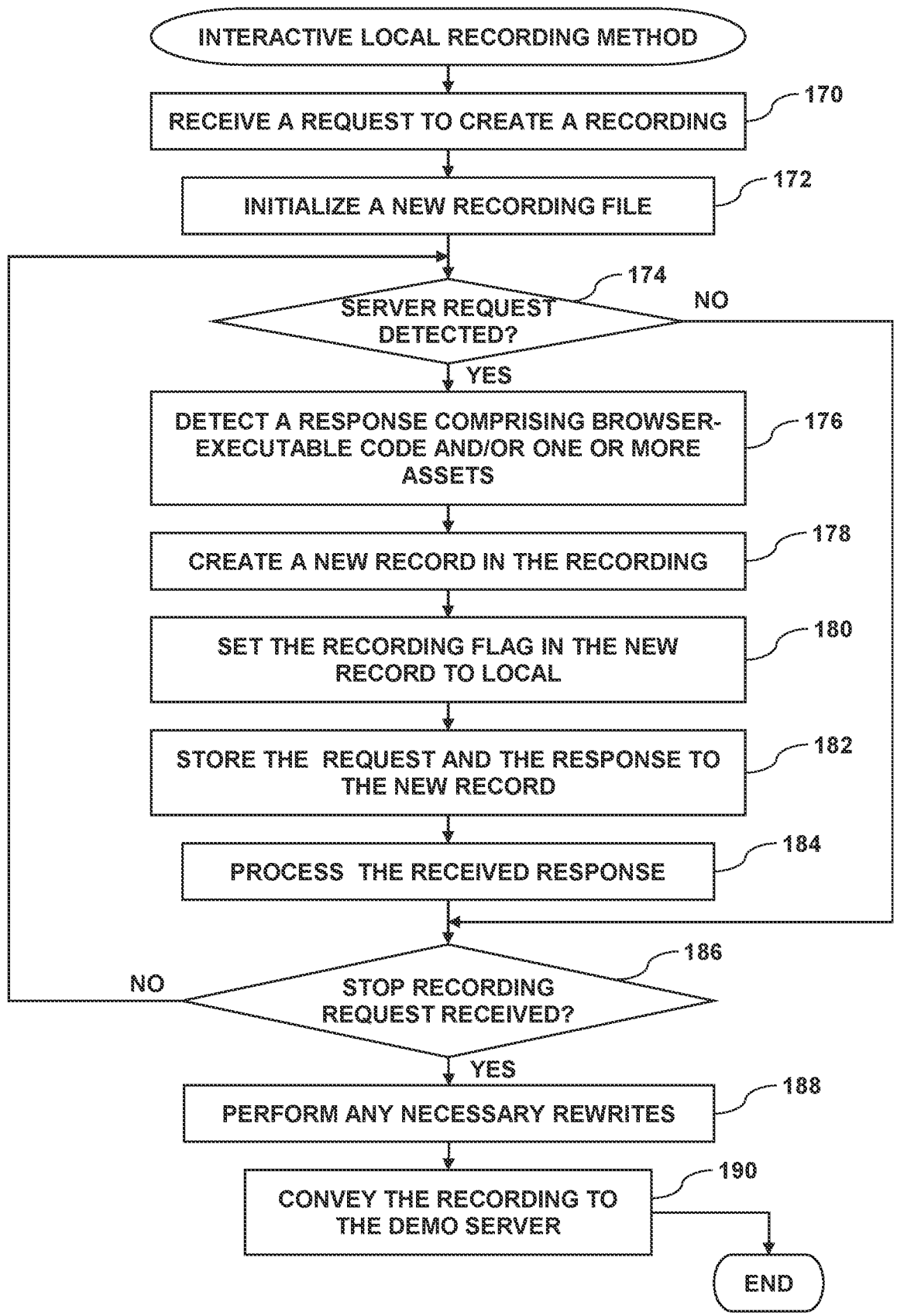
FIG. 10 is a flow diagram that schematically illustrates a method of creating a demo recording using the local recording module, in accordance with an embodiment of the present invention.

FIG. 10 is a flow diagram that schematically illustrates a method of using recording module 94 to create demo recording 26, in accordance with an embodiment of the present invention. In the steps for FIG. 10 hereinbelow, processor 80 is executing demo application 28.

In step 170, demo application 24 receives a (local) request to create a new demo recording 26. In some embodiments, the request comprises a signal from custom browser 92 indicating mouse 88 clicked on recording button 112.

In step 172, demo application 24 initializes demo recording 26. To start recording demo recording 26, custom browser starts executing web-based application 28 by receiving and executing the browser executable code in the web page indicated by home URL 56.

In step 174, if modified network layer 102 detects a given request 42 (i.e., from custom browser 92) to a given server 32, then in step 176, the modified network layer detects the response from the given server. As described supra, the given response may comprise one or more web resources 138 such as browser executable code 62 and/or one or more assets 64.

When accessing web-based application 28 when generating (i.e., "recording") demo recording 26, examples of requests 42 that modified network layer 102 can detect include:
- A given HTTP request 42 from user 108 indicating a given URL 46. For example, custom browser 92 may generate the given HTTP request in response to user 108 entering the given URL in address bar 106.
- A given request 42 for a given web resource 138 (i.e., additional browser-executable code 140 or a given asset 160) generated by browser-executable code 140 executing in the custom browser. For example, the browser-executable code executing in the custom browser may comprise an HTML tag that requests an image from a given server 32C.

In step 178, modified network layer 102 creates a new record 130 in demo recording 26, and in step 180, the modified network layer sets recording flag 136 in the new record to LOCAL.

In step 182, modified network layer 102 stores, to the new record, the detected server request to request 132 and stores the detected response (i.e., original browser-executable code 140) to server response 134.

In step 184, custom browser 92 processes the received response. In one example, if the response comprises browser-executable code 62, the custom browser 92 processes the received response by executing the browser-executable code. In another example, if the response comprises an asset such as an image, the browser-executable code can present the received image in rendering 110.

In step 186, if recording module 94 receives a stop recording request 42 (e.g., the recording module received a signal from custom browser indicating mouse 88 clicked on recording button. 112 while generating demo recording 26), then in step 188, the recording module starts executing rewrite module 98 so as to modify demo recording 26 so that it can be stored on demo server 32B and executed by stock web browser 90. Rewrite module 98 modifying demo recording 26 is described in the description referencing FIG. 12 hereinbelow.

In another embodiment, demo application 24 can execute rewrite module 98 in response to receiving a signal from custom browser 92 indicating mouse 88 clicked on rewrite but 115.

Finally, in step 190, recording module conveys (i.e., stores) demo recording 26 to demo server 32B, and the method ends.

Returning to step 186, if recording module 94 does not receive a stop recording request 42, then the method returns to step 174. Returning to step 174, if modified network layer 102 does not detect a given request 42, then the method continues with step 186.

While embodiments referenced in FIG. 10 describe network modified layer 102 detecting pairs of server requests 42 and server responses 44, other types of software executing on processor 80 are considered to be within the spirit and scope of the present invention. In a first alternative embodiment, processor 80 may execute software application such as a browser extension (i.e., for stock web browser 90), a network traffic analyzer such as a sniffer or virtual private network software that can detect (and record) the request/response pairs. In an additional embodiment, using a hardware component (i.e., within or coupled to a the client computer generating demo recording 26) to detect the request/response pairs is also considered to be within the spirit and scope of the present invention.

FIG. 11 is a flow diagram that schematically illustrates a method of using recording module 94 to create demo recording by using web crawler bot 96, in accordance with an embodiment of the present invention. In this embodiment, there is no interaction needed from user 106 to create demo recording for web-based application 26. While embodiments described in FIG. 100 have web crawler bot 96 crawling multiple web pages 54 in web-based application. 28, executing any software application that can retrieve the multiple web pages so as to generate demo recording 26 is considered to be within the spirit and scope of the present invention.

In step 200, demo application 24 receives a (local) request, e.g., from user 108, to create a new recording by "crawling" web application 28. In some embodiments, the request comprises a signal from custom browser indicating mouse 88 clicked on crawl button 114.

In step 202, demo application 24 initializes demo recording 26, and in step 204, recording module 94 conveys home URL 56 to web crawler bot 96.

In step 206, web crawler bot 96 retrieves, from application server 32A, the web page indicated by home URL 56, identifies one or more requests 42 in the browser-executable code of the retrieved web page, and creates a set comprising the one or more identified server requests.

In step 208, web crawler bot 96 selects the first server request in the set, and in step 210, the web crawler bot conveys the selected server request to the server indicated in the selected server request (e.g., the selected server request may comprise a given request 42 to application server 32A or a given resource server 323).

In step 212, web crawler bot 96 receives a given response 44 to the conveyed server request. In embodiments herein, the received response may comprise one or more web resources 138 such as browser-executable code 62 and/or one or more assets 64.

In step 214, if the received response comprises browser-executable code 62, then web crawler bot 96 analyzes the received browser-executable code to see if there are any requests 42 in the received browser-executable code. If web crawler bot 96 identifies any requests 42 in the received browser-executable code, then the web crawler bot adds the identified HPPT request(s) to the set.

In step 216, web crawler bot 96 adds a new record 130 to demo recording 26, and in step 218, the web crawler bot stores, to the new record, the selected (i.e., from the set) request (i.e., to request 132) and the received response (i.e., to response 134).

In step 220, if web crawler bot 96 detects that there are any non-conveyed requests 42 in the set, then in step 222, the web crawler bot selects the next request 42 in the set, and the method continues with step 210.

Returning to step 220, if web crawler but 96 does not detects any non-conveyed requests 42 in the set, then in step 224, the recording module starts executing rewrite module 98 so as to modify the demo recording so that it can be stored on demo server 32B and executed by stock web browser 90. Rewrite module 98 modifying demo recording 26 is described in the description referencing FIG. 12 hereinbelow.

In another embodiment, demo application 28 can execute rewrite module 98 in response to receiving a signal from custom browser indicating mouse 88 clicked on rewrite button 116.

Finally, in step 226, recording module conveys (i.e., stores) demo recording 26 to demo server 32B, and the method ends.

The description referencing FIGS. 10 and 11 hereinabove describe two different embodiments for generating demo recording 26. When detecting the pairs of requests 42 and responses 44, browser executable code 62' and assets 64 may referenced via a single domain name 36 (i.e., for a given server 32) or via multiple different domain names 36 (i.e., for a single server 32 or for respective servers 32).

Figure 12:
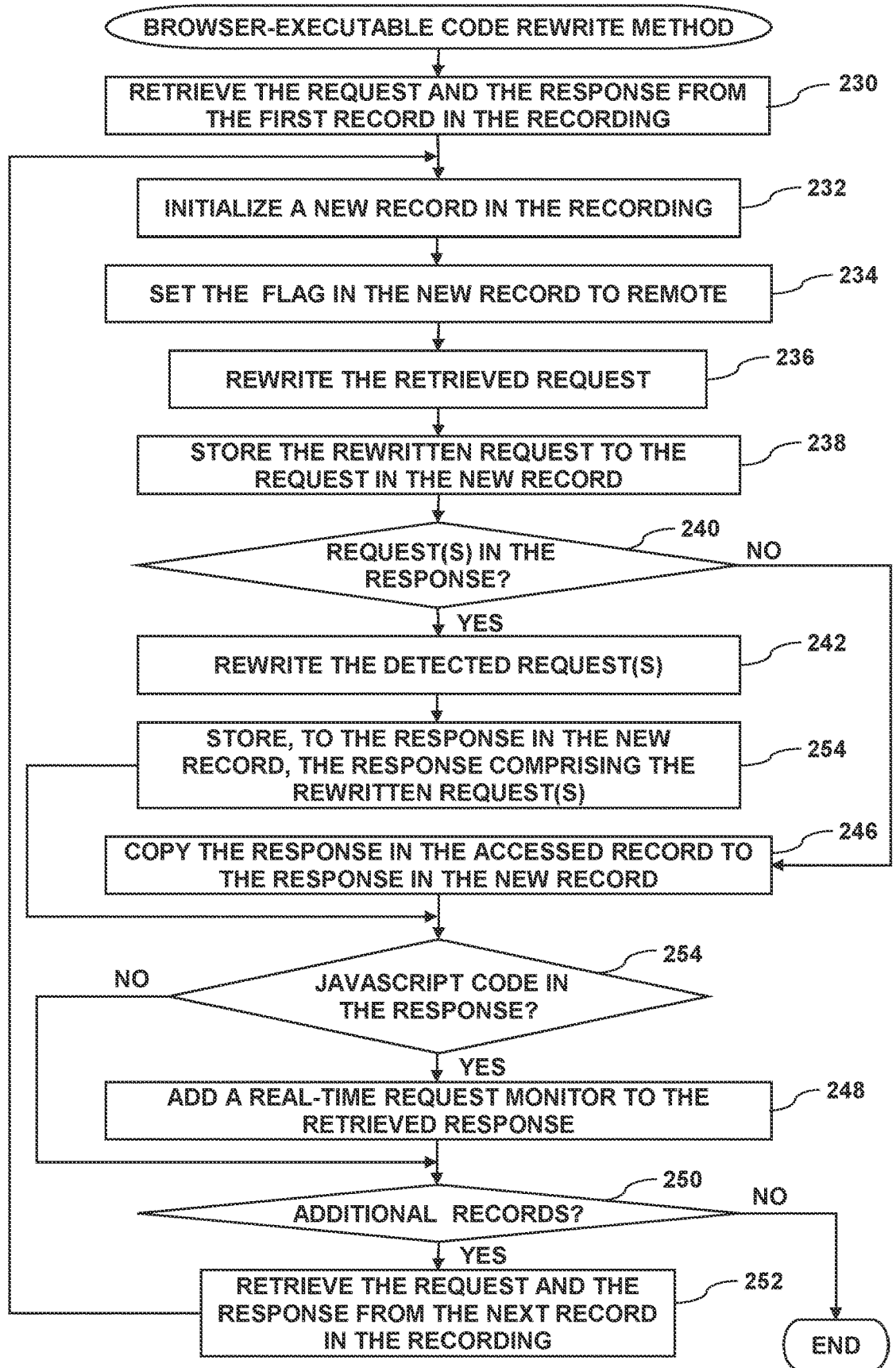
FIG. 12 is a flow diagram that schematically illustrates a method of rewriting the responses in the demo recording, in accordance with an embodiment of the present invention.

FIG. 12 is a flow diagram that schematically illustrates a method of rewriting the responses in demo recording 26, in accordance with an embodiment of the present invention. As described supra, demo recording 26 comprises a pair of records 130 for each request 42 and its corresponding response 44. Upon completing the embodiments described in the description referencing FIGS. 10 and 11 hereinabove, recording module 94 generated the first records of the pairs comprising non-modified copies of requests 42 and their corresponding responses 44. The steps hereinbelow described generating the second records of the pairs that store rewritten requests 42 and rewritten responses 44.

The following are two examples of requests 42 that may be stored in demo recording 26. The first example is a given HTTP request 42 for a given web page 54 and the second example is a given HTTP request 42 for a Given asset 64 (note that the HTTP requests may be stored in a given HTTP request 132 or embedded in browser-executable code 62 in a given response 134):

GET /pageX.html HTTP/1.1
   Host: www.webappX.com
GET /assetX HTTP/1.1
   Host: www.serverX.com In step 230, rewrite module 98 retrieves request 132 and response from the first record in demo recording 26.

In step 232, rewrite module 98 adds and initializes a new record 130 to demo recording 26, and in step 234 the rewrite module sets flag 136 in the first record to REMOTE, indicating that the new record (i.e., the second record in the pair) can be replayed by stock web browser 90.

In step 236 rewrite module 98 rewrites retrieved request 132. In some embodiments, rewrite module 98 rewrites the server requests so that demo recording 26 can be stored on demo server 32B, and upon client computer 22 executing stock web browser 90 to replay the demo recording (i.e., from the demo server), all the server requests in the demo recording are proxied (i.e., redirected) to the demo recording stored on the demo server. For example, if URL 46 for demo server 32B is www.demox.com, then rewrite module 98 can rewrite the HTTP request examples described supra as follows:

GET /www.webappX.com/pageX.html HTTP/1.1
   Host: www.demox.com
GET /www.serverX.com/assetX HTTP/1.1
   Host: www.demox.com In these rewritten HTTP requests, the modified URL 46 is:
   www.demox.com/www.webappX.com In step 238, rewrite module 98 stores the rewritten request to request 132 in the new record.

In step 240, rewrite module 98 analyzes the retrieved response so as to determine whether or not there are any requests 42 in the retrieved response. If rewrite module 98 detects any requests 42 in the retrieved response, then in step 242, the rewrite module rewrites the detected requests using embodiments described in step 236.

In step 244, rewrite module 98 stores the rewritten response (i.e., rewritten browser-executable code 150) to response 134 in the new record.

In step 246 rewrite module 98 analyzes the retrieved response so as to determine whether or not the retrieved response comprises browser-executable code 62 that comprises JavaScript code or HTML code. If rewrite module 98 detects any JavaScript code in the retrieved response, then in step 248, rewrite module 98 adds and/or registers to code hooks in the JavaScript code (and in case of HTML adds real-time request monitor monitor 152 to the JavaScript code), and saves the modified JavaScript and/or modified HTML code (i.e., with the real-time request monitor) to response 134 in the new record.

In step 250, if rewrite module 98 detects any non-accessed records 130 in demo recording 26, then in step 252, the rewrite module retrieves request 132 and response 134 from the next record in the demo recording, and the method continues with step 232.

Returning to step 250, if rewrite module 98 does not detect any non-accessed records 130 in demo recording 26, then the method ends.

Returning to step 246, if rewrite module 98 does not detect any JavaScript or HTML code in the retrieved response, then the method continues with step 250.

Returning to step 240, if rewrite module 98 does not detect any requests 42 in the retrieved response, then in step 254, then rewrite module copies the retrieved response to response 134 in the new record, and the method continues with step 246.

Demo Recording Playback

Figure 13:
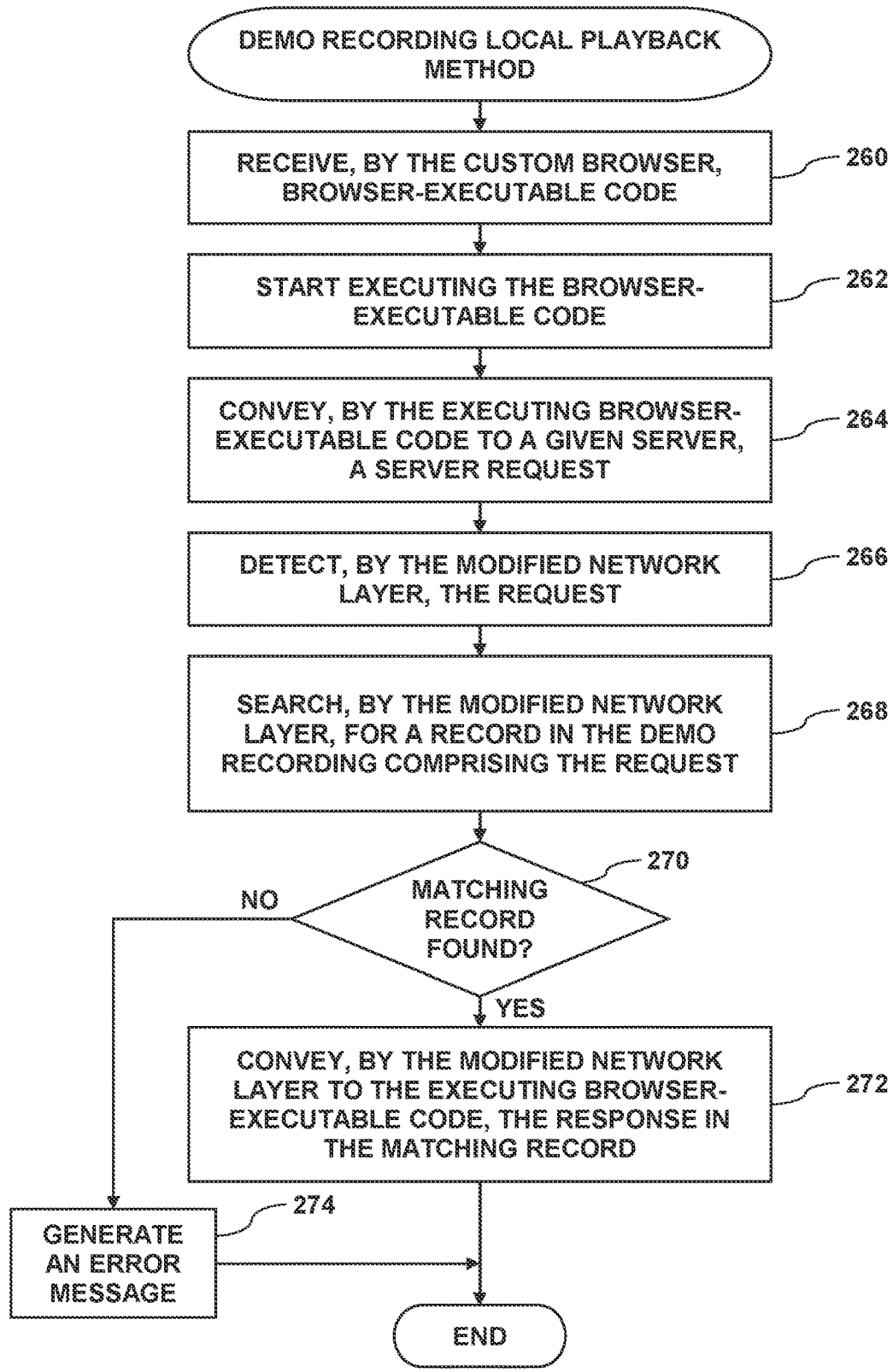
FIG. 13 is a flow diagram that schematically illustrates a method of using a local playback module to play back a demo recording stored on the client computer, in accordance with an embodiment of the present invention.
Figure 14:
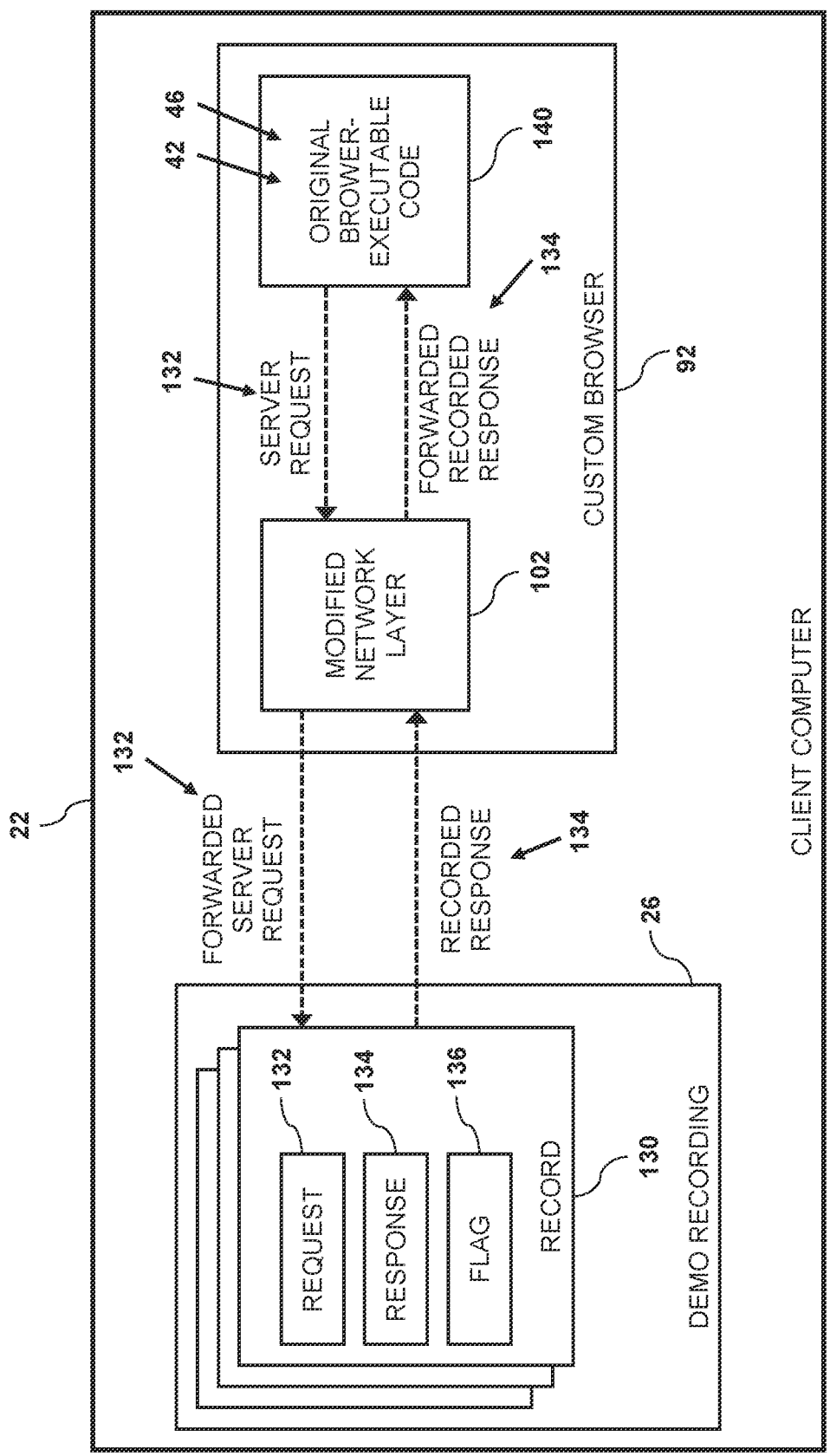
FIG. 14 is a block diagram that schematically illustrates data flowing through a modified network layer of a custom browser when playing back the demo recording using the local playback module, in accordance with an embodiment of the present invention.

FIG. 13 is a flow diagram that schematically illustrates a method of using local playback module 100 to play back demo recording 26 on client computer 22, and FIG. 14 is a block diagram that schematically illustrates data flowing through modified network layer 102 of custom browser 92 executing on processor 80 when playing back the demo recording on the client computer, in accordance with an embodiment of the present invention.

In step 260, demo application 24 receives a (local) request to play back demo recording 26. In some embodiments, the request comprises a signal from custom browser indicating mouse 88 clicked on replay button 118. In a first playback embodiment demo 26 recording may be stored on (and retrieved from) demo server 32 (or any other server that can communicate with client computer 22). In a second playback embodiment, demo recording 26 may be stored on (and retrieved from) memory 82 in client computer 22. When demo recording 26 is stored on client computer 22, demo application 24 can execute the recording when the client computer is offline (i.e., not connected to any data network such as LAN 30).

In step 262, custom browser 92 receives browser-executable code 62, and initiates execution of the browser-executable code 62 in web-based application 20. In some embodiments, custom browser 92 can initiate execution of web-based application 28 in response to local playback module conveying, to modified network layer 102, a request to retrieve, from demo recording 26, response 134 in the first record whose respective flag 136 is set to LOCAL, and the modified network layer conveying the requested response to the custom browser.

In step 264, the browser-executable code executing on custom browser 92 conveys a given request 42 to a given server 32, and in step 266 modified network layer 102 detects (i.e., "captures") the conveyed server request.

In step 268, modified network layer 102 searches demo recording 26 so as to find a given record 130 whose request 132 matches the conveyed request. In some embodiments, modified network layer 102 can restrict the search by only searching records 130 whose respective flags 136 are set to LOCAL.

In step 270 modified network layer 102 detected a matching record 130, then in step 272, the modified network layer conveys response 134 in the matching record to the browser-executable code, and the method ends.

Returning to step 270, if modified network layer 102 does not detect a matching record, then in step 274, the modified network layer can generate an error message, and the method ends. In some embodiments, upon modified network layer 102 generating the error message, modified network layer can present the error message in rendering 110 on display 84.

While the steps for local recording and local playback described in the descriptions referencing FIGS. 10 and 14 are performed by processor 80 (i.e., a single client computer 22), having processor 80 generate demo recording 26 (i.e., as described in the description referencing FIG. 10 hereinabove), and having an additional processor 80 in an additional client 22 (not shown) play back the demo recording (i.e., as described in the description referencing FIG. 14 hereinabove) is considered to be within the spirit and scope of the present invention.

FIG. 15 is a flow diagram that schematically illustrates a method of client computer 22 playing back demo recording 26 stored on a demo server 32B, and FIG. 16 is a block diagram that schematically illustrates data flowing between the stock browser executing on client computer 22 and the demo server when playing back the demo recording, in accordance with an embodiment of the present invention.

In embodiments described hereinbelow, processor 80 executes stock browser 90, which can access, via playback application 120, demo recording 26 on demo server 32E. When executing demo recording 26 via playback application 120, the playback application may "wrap" real-time request monitor 152 around rewritten browser-executable code 150, thereby enable the real-time request monitor to "trap" any requests 42 dynamically generated by the rewritten browser-executable code.

In step 280, processor 52E receives, from stock web browser 90 executing on processor 80, a request to play back demo recording 26. In one embodiment, the request may comprise:

A first request from stock browser 90 to execute (i.e., download and execute) playback application 120.

A second request from playback application 120 to demo recording 26.

In step 282, processor 52B identifies, in demo recording 26 in response to receiving the request, the first record 130 whose respective flag 136 is set to REMOTE and in step 284, the demo processor conveys, to client computer, response 134 in the first record. Since the first record is typically the starting point for the demo recording, response 134 in the first record may rewritten browser-executable code 150.

Upon receiving response 134, in step 286, stock web browser 90 initiates execution of the (rewritten) browser-executable code in the received response. While executing the (rewritten) browser-executable code, stock web browser 90 may convey, to demo server 323, one or more requests 42 that are in the executing code. Upon receiving the each conveyed request. 42, processor 623 identifies a given record 130 whose respective request. 132 matches the received request, and conveys response 44 (comprising response 134 in the identified record) to (the stock web browser executing in) client computer 22.

While the server requests were conveyed to application server 32A and possibly to one or more resource servers 32C during the recording process, the records 130 created by rewrite module 98 comprise requests 132 that are rewritten (using embodiments describes supra) so that the server requests are conveyed to demo server 32B during remote playback. This can be implemented by restricting stock web browser 90 to only access records 130 whose respective flags 136 are set to REMOTE.

In some embodiments, when stock browser 90 executes rewritten browser-executable code 150, the rewritten browser-executable code may dynamically generate a given request 42 that attempts to access or manipulate a resource that is not available to processor 80 executing the stock browser. These dynamic requests may not be detected by static code analysis methods used by the rewrite embodiments described in the description referencing FIG. 12 hereinabove.

In step 288, if real-time request monitor 152 detects, while executing the (rewritten) browser-executable code, any requests 42 to access or manipulate a resource not available to processor to processor 80 executing the stock browser, then in step 290 the real-time request monitor invokes rewrite module 98 so as to modify (i.e., rewrite) the one or more detected server requests using embodiments described supra, and in step 292, stock web browser 90 executes the modified request. In some embodiments, modifying a given request may comprise generating a simulated response to the request.

As described supra, real-time request monitor 152 may be inserted into rewritten browser-executable code 150 by rewrite module 98 (during the rewrite process) or playback application 120 (when conveying, to the workstation the rewritten code in a given response 44). In some embodiments rewrite module 98 may insert a first instance of real-time request monitor 152 into browser-executable code 150, and playback application 120 may insert a second (and different) instance of the real-time request monitor into the browser-executable code.

In one example, rewritten browser executable code 159 may dynamically generate a given request 42 to retrieve the IP address currently being accessed by stock browser 90, and compare the retrieved IP address to one or more valid IP addresses. In this example, real-time request monitor 152 can dynamically (i.e., while executing the browser executable code comprising the real-time request monitor) modify the given request so that the corresponding response 44 comprises a given valid IP address.

In another example, rewritten browser executable code 159 may dynamically generate a given request 42 to access a given browser frame 104 that may not exist during playback. In this example, real-time request monitor 152 can modify the given request so that the corresponding response 44 indicates successful access to the given browser frame.

In an additional example, rewritten browser executable code 150 may dynamically generate a given request 42 to write (i.e., convey) a given cookie 97 to a given server 34 (i.e., other than demo server 34B). In this example, real-time request monitor 152 can modify the given request so that either (a) the executing rewritten browser executable code 150 conveys the given cookie to demo server 34B, or (b) the real-time request monitor can provide, to the rewritten browser executable code 159, and indication that the given cookie was successfully written to the given server.

In some embodiments, monitor 152 can detect a given dynamically generated request by detecting, while executing the (rewritten) browser-executable code, any new Document Object Model (DOM) elements 300 in DOM 302 (FIG. 16), and analyzing the new DOM element(s) so as to determine whether or not any of the new DOM element(s) comprise any new (i.e., not rewritten) requests 42.

Returning to step 288, if real-time request monitor 152 does not detect, while executing the (rewritten) browser-executable code, any requests 42 to access or manipulate a resource not available to processor to processor 80 executing the stock browser, then the method ends.

During remote playback, requests 132 in records 130 in demo recording 26 may be referenced via a single domain name 36 (i.e., for a given server 32) or via multiple different domain names 36 (i.e., for a single server 32 or for respective servers 32). For example, records 130 comprising rewritten browser-executable code 150 may be stored on a first given server 32, and records 130 comprising assets 160 can be stored on the first given server and/or a second given server 32.

It will be appreciated that the embodiments described above are cited by way of example, and that the present invention is not limited to what has been particularly shown and described hereinabove. Rather, the scope or the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
executing, by a processor, a web browser;
detecting, by the processor, a first request comprising a Hypertext Transfer Protocol (HTTP) request conveyed by the web browser to a first server for a web page comprising browser-executable code for a web-based application, and a first response received from the first server comprising the requested browser-executable code, wherein the first request comprises a first Uniform Resource Locator (URL);
identifying, in the browser-executable code, a second request to a second server for a web resource and comprising a second URL;
detecting a second response received from the second server comprising the requested web resource;
modifying, in the browser-executable code, the second URL so as to reference a third server;
modifying the first URL so as to reference a fourth server;
storing, on the fourth server, the modified browser-executable code so as to be referenced by the modified first URL;
receiving, by the fourth server from a client computer subsequent to storing the modified browser-executable code, a third request comprising an HTTP request comprising the modified first URL;
conveying, by the fourth server responsively to the third request, the modified browser-executable code to the client computer; and
subsequent to conveying the modified browser-executable code, receiving, by the third server from the client computer, a fourth request for the web resource and comprising the modified second URL,
wherein the first, second, third, and fourth servers are implemented as four different server processes.

2. The method according to claim 1, wherein the servers have respective domain names, and wherein the domain name for the first server matches the domain name for the second server.

3. The method according to claim 1, wherein the first server and the second server have respective domain names, and wherein the domain name for the first server does not match the domain name for the second server.

4. The method according to claim 1, wherein the third server and the fourth server have respective domain names, and wherein the domain name for the third server matches the domain name for the fourth server.

5. The method according to claim 1, wherein the third server and the second server have respective domain names, and wherein the domain name for the first server does not match the domain name for the second server.

6. The method according to claim 1, wherein the processor and the second server communicate via a private network.

7. The method according to claim 1, and further comprising storing the web resource to the third server so as to be referenced by the modified second URL.

8. The method according to claim 7, and further comprising conveying, by the third server responsively to the fourth request, the stored web resource to the client computer.

9. The method according to claim 1, wherein the browser-executable code comprises a first browser-executable code, and wherein the web resource comprises a second browser-executable code.

10. The method according to claim 9, wherein the executable code comprises HyperText Markup Language (HTML) code.

11. The method according to claim 9, wherein the browser executable code comprises JavaScript code.

12. The method according to claim 9, wherein the browser executable code comprises Cascading Style Sheet (CSS) code.

13. The method according to claim 9, wherein the browser executable code comprises executable binary code.

14. The method according to claim 1, wherein the web resource comprises a font.

15. The method according to claim 1, wherein the web resource comprises an image.

16. The method according to claim 1, wherein the web resource comprises cleartext.

17. The method according to claim 1, wherein the second request comprises an application program interface (API) call, and wherein the web resource comprises an API service.

18. The method according to claim 1, wherein the second request comprises a database query, and wherein the web resource comprises database data.

19. The method according to claim 1, wherein the browser-executable code for a web-based application references a first set of resources, and further comprising detecting, by the client computer, an additional request from the modified browser-executable code to access or manipulate a given resource, and providing, by the client computer a response simulating the given resource.

20. An apparatus, comprising:
a memory configured to store a web browser; and
a processor configured:
to execute the web browser,
to detect a first request comprising a Hypertext Transfer Protocol (HTTP) request conveyed by the web browser to a first server for a web page comprising browser-executable code for a web-based application, and a response received from the first server comprising the requested browser-executable code, wherein the first request comprises a first Uniform Resource Locator (URL),
to identify, in the browser-executable code, a second request to a second server for a web resource and comprising a second URL,
to detect a response received from the second server comprising the requested web resource,
to modify, in the browser-executable code, the second URL so as to reference a third server,
to modify the first URL so as to reference a fourth server, and
to store, on the fourth server, the modified browser-executable code so as to be referenced by the modified first URL,
wherein the fourth server is configured to receive, from a client computer subsequent to storing the modified browser-executable code, a third request comprising an HTTP request comprising the modified first URL, and to convey, responsively to the third request, the modified browser-executable code to the client computer, and wherein subsequent to the fourth server conveying the modified browser-executable code, the third server is configured to receive, from the client computer, a fourth request for the web resource and comprising the modified second URL,
wherein the first, second, third, and fourth servers are implemented as four different server processes.

21. The apparatus according to claim 20, wherein the processor is further configured to store the web resource to the third server so as to be referenced by the modified second URL.

22. The apparatus according to claim 21, wherein in response to receiving the fourth request, the third server is configured to convey the stored web resource to the client computer.

23. A computer software product, comprising a non-transitory computer-readable medium, in which program instructions are stored, which instructions, when read by a one or more computers, cause the one or more computers:
to execute a web browser;
to detect a first request comprising a Hypertext Transfer Protocol (HTTP) request conveyed by the web browser to a first server fora web page comprising browser-executable code for a web-based application, and a response received from the first server comprising the requested browser-executable code, wherein the first request comprises a first Uniform Resource Locator (URL);
to identify, in the browser-executable code, a second request to a second server for a web resource and comprising a second URL;
to detect a response received from the second server comprising the requested web resource;
to modify, in the browser-executable code, the second URL so as to reference a third server;
to modify the first URL so as to reference a fourth server;
to store, on the fourth server, the modified browser-executable code so as to be referenced by the modified first URL;
to receive by the fourth server, from a client computer subsequent to storing the modified browser-executable code, a third request comprising an HTTP request comprising the modified first URL;
to convey, responsively to the third request, the modified browser-executable code from the fourth server to the client computer; and
subsequent to the fourth server conveying the modified browser-executable code, to receive by the third server from the client computer, a fourth request for the web resource and comprising the modified second URL,
wherein the first, second, third, and fourth servers are implemented as four different server processes.

24. The computer software product according to claim 23, wherein the program instructions are also configured to store the web resource to the third server so as to be referenced by the modified second URL.

25. The computer software product according to claim 24, wherein the supplemental program instructions are also configured to conveying, responsively to the fourth request, the stored web resource to the client computer.

* * * * *